United States Patent [19]

Roberts

[11] Patent Number: 4,959,113

[45] Date of Patent: Sep. 25, 1990

[54] METHOD AND COMPOSITION FOR POLISHING METAL SURFACES

[75] Inventor: John V. H. Roberts, Newark, Del.

[73] Assignee: Rodel, Inc., Newark, Del.

[21] Appl. No.: 387,474

[22] Filed: Jul. 31, 1989

[51] Int. Cl.⁵ .......................... B44C 1/22; C23F 1/00; C03C 15/06; C03C 25/06
[52] U.S. Cl. ................................... 156/636; 156/639; 156/645; 156/656; 156/664; 156/903; 252/79.2
[58] Field of Search ............... 156/636, 639, 645, 656, 156/664, 903; 252/79.2; 51/281 R, 317

[56] References Cited

U.S. PATENT DOCUMENTS 4,305,779 12/1981 Steeves et al. ...................... 156/636
4,475,981 10/1984 Rea ..................................... 156/636

FOREIGN PATENT DOCUMENTS 53-3518 2/1978 Japan .

*Primary Examiner*—William A. Powell
*Attorney, Agent, or Firm*—Panitch Schwarze Jacobs & Nadel

[57] ABSTRACT

The present invention relates to a method of polishing a metal surface using an aqueous polishing composition for metal surfaces comprising water, an abrasive agent, such as aluminum oxide, cerium oxide, zirconium oxide, tin oxide, silicon dioxide, silicon carbide, titanium dioxide and titanium carbide and a salt, or combination of salts, such as aluminum chloride, zirconyl nitrate, zirconyl sulfate, cerium nitrate, aluminum nitrate, aluminum bromide, aluminum iodide, aluminum chloride, zirconyl chloride, tin chloride, aluminum perchlorate, magnesium chloride, zinc chloride, magnesium perchlorate and iron chloride.

20 Claims, No Drawings

METHOD AND COMPOSITION FOR POLISHING METAL SURFACES

BACKGROUND OF THE INVENTION

1. Field of the Invention

This invention relates to a method of polishing metal surfaces using a polishing composition which provides a rapid polishing rate of metal surfaces while producing a high quality surface, as well as a novel metal polishing composition.

More specifically, the present invention relates to a method of polishing metal surfaces using an aqueous polishing composition comprising an abrasive agent, a salt or combination of salts and optionally an acid for polishing metal surfaces such as metal optics, memory discs, machine tools, compact disc stampers, decorative metal surfaces, mechanical parts, and the like, and a novel composition for use in the method.

2. Description of the Prior Art

Conventional polishing compositions normally used for polishing metal surfaces comprise an aqueous slurry of an abrasive agent such as cerium oxide, aluminum oxide, zirconium oxide, tin oxide, silicon dioxide, titanium dioxide, and the like. The polishing composition is applied to the metal surface to allow polishing by using a polishing pad. However, the conventional polishing agent requires a considerable amount of time for obtaining a smooth surface and good gloss. Attempts to improve the polishing efficiency by increasing the particle size of the abrasive tends to cause deep scratches, roughened surfaces and the like. This makes it difficult to obtain a smooth and defect-free surface.

The present invention overcomes the undesirable aspects and disadvantages associated with prior art metal surface polishing compositions. The present invention provides a considerable increase in polishing rate while furnishing a high quality surface, with reduced polishing defects such as scratches, orange peel and other surface defects.

DEFINITIONS

"Salt" as used herein, is a compound produced from the reaction of an acid and a base, or a metal and an acid either in a separate prior reaction or in situ in the ultimate mixture in which the salt is to be used.

SUMMARY OF THE INVENTION

One aspect of the invention relates to a method for polishing a metal surface comprising (a) providing an aqueous polishing composition comprising water, an abrasive agent and a salt; (b) applying the composition to a metal surface to be polished; and (c) polishing the metal surface.

Another aspect of the invention relates to a polishing composition for polishing metal surfaces comprising water, an abrasive agent selected from the group consisting of aluminum oxide, cerium oxide, zirconium oxide, tin oxide, silicon dioxide, silicon carbide, titanium dioxide and titanium carbide and a salt selected from the group consisting of magnesium chloride, aluminum perchlorate and magnesium perchlorate.

DETAILED DESCRIPTION OF THE PREFERRED EMBODIMENTS

The present invention is based on the discovery that an aqueous polishing composition comprising an abrasive agent and a salt or combination of salts provide enhanced polishing of metal surfaces, such as aluminum, nickel, iron, steel, copper, beryllium, zinc, titanium, chromium and the like, and particularly metal surfaces where a highly polished, mirror-like surface is desired or essential, such as memory discs, metal optics, such as used in spacecraft and telescope mirrors and the like.

The abrasive agent used in the present invention may be any suitable abrasive agent in particle form, used to polish metal surfaces. Typical abrasive agents include, for example, aluminum oxide, cerium oxide, zirconium oxide, tin oxide, silicon dioxide, silicon carbide, titanium dioxide and titanium carbide.

The addition of the salt or combination of salts promotes the polishing effectiveness of the metal surface by the abrasive of the polishing composition. The exact reason why the polishing effectiveness is enhanced by the inclusion of the salt component is presently unknown. However, based on experiments to be described hereinafter, it appears that a synergistic polishing of metal surfaces occurs. Although the inventor does not wish to be bound by any particular theory, it is believed that the polishing improvement results from the reaction of the salt with the metal surface. In the case of aluminum nitrate, for example, the aluminum nitrate is believed to react with the metal surface generating the metal nitrate and colloidal alumina. The colloidal alumina may then act as a barrier layer between the metal surface and the polishing pad and abrasive, thereby protecting the surface against scratching and pitting. The type of reaction between the salt and the metal surface is not achieved when a polishing composition is used with a non-metallic surface, such as when this or a prior art polishing composition is used to polish synthetic resin articles.

The salt component of the present invention is a reaction product of an acid and a base or an acid and a metal. Thus, the salt includes a cationic component and an anionic component. The cationic component may be substantially any of the ionized elements which will not deposit by electroless plating on the metal surface being polished. For example, one would not use copper or nickel since these metals may be deposited by electroless plating on a metal surface being polished. A preferred cationic component of the salt is an ionized element from Groups IIA, IIIA, IVA and IVB of the periodic table of elements, as well as zinc, cerium, tin (2+ or 3+) and iron (2+ or 3+) ions. One generally would not use the heavy metals of the indicated groups because of cost and pollution factors. The zirconyl cation, $ZrO^{2+}$, is among the preferred cations, whereas cations found in Group Ia in the Periodic Table of elements, including lithium, sodium and potassium, should be avoided as they cause pitting with no significant improvement in removal or surface finish.

The anionic component of the salt preferably includes chloride, bromide, iodide, nitrate, sulfate, phosphate and perchlorate ions.

An aqueous polishing composition comprising a combination of salts with the water and abrasive agent provides improved polishing of metal surfaces compared to the use of a single salt. Thus, there appears to be a synergistic effect when a combination of two or more salts is used in the polishing composition compared to the use of a single salt.

A preferred aqueous polishing composition used in the preferred method of the present invention can be formulated using at least one salt comprising aluminum chloride, zirconyl nitrate, zirconyl sulfate, cerium nitrate, aluminum nitrate, aluminum bromide, aluminum iodide, aluminum chloride, zirconyl chloride, tin chloride, aluminum perchlorate, magnesium chloride, zinc chloride, magnesium perchlorate, iron chloride, or the like.

The salt component of the polishing composition of the present invention is present in an amount effective to promote the polishing effectiveness of the abrasive agent in the polishing composition. The water component of the polishing composition is primarily merely a suspending agent for suspending the solid components and as a solvent for the salt component. If desired, the polishing composition can be prepared in a concentrated form and diluted for use by the addition of water to the desired concentration.

It is believed that even a trace amount of salt present in the polishing composition is effective for promoting the polishing effectiveness of the abrasive. A satisfactory polishing efficiency is obtained by using the salt in an amount of about 0.1% by weight to about 50% by weight of the composition. This upper limit is acceptable for some very hard substrates, such as tungsten or steel, which are quite resistant to pitting. A preferred range for the salt component is about 0.25% by weight up to an amount which will not cause pitting of the substrate. The type of salt or salts, abrasive agent and substrate are all interdependent factors to be considered in determining the upper limit. As presently preferred, particularly for soft substrates, such as aluminum or even nickel plated aluminum substrates, an effective upper limit for the salt component is about 10% by weight of the aqueous polishing composition.

The polishing composition can be made by uniformly mixing the salt or combination of salts, the abrasive agent and water. The abrasive agent should be comprised of fine particles, preferably about 20 microns or less in particle size. The abrasive agent may be present in any suitable amount, typically about 10% by weight of the aqueous polishing composition.

Since the salt normally dissolves in the water used, the particle size of the salt is not critical. However, the salt particle size is desirably small enough so as to rapidly dissolve in water. In addition, many of these salts are preferably in hydrated form to prevent decomposition upon contact with water.

The temperature at which the abrasive agent, salt or combination of salts and water is mixed, the rate of addition of abrasive agent and salt or combination of salts to the water, and the mixing parameters, such as the mixing rate of the abrasive agent, salt or combination of salts and water to form the polishing composition, are generally as followed in the industry, and well known to those skilled in the art.

The polishing composition should be formulated so as to give a polishing slurry having a desirable concentration and viscosity. Preferably, the combined concentration of the polishing agent and salt or combination of salts is from about 2% by weight to about 50% by weight. The desirable viscosity range should be high enough to reduce excessive settling of the abrasive, yet low enough such that the polishing composition is free flowing.

Furthermore, the addition of acids has been shown to be beneficial to the polishing process. Lowering the pH to a range of about 1 to about 6 by the addition of an acid, such as nitric acid, sulfuric acid, hydrochloric acid, phosphoric acid and the like, enhances performance of the polishing composition and method. The reasons for the enhancement are not known.

In addition, the polishing composition salt or salts may be generated in situ. The appropriate acid and base may be added to an aqueous slurry of the abrasive compound, for example, $Mg(OH)_2$ may be combined with $HNO_3$ to form $Mg(NO_3)_2$ and water. Alternatively, the salt or salts may be generated in situ by the addition of the metal with an acid, for example, powdered zinc metal plus hydrochloric acid to form $ZnCl_2$.

The polishing method of the present invention is carried out by applying the aqueous polishing composition, normally at room temperature. The metal surface is then polished with the polishing composition using a felt or other polishing pad. Typical polishing pads include, for example, "Politex Supreme" of Rodel, Inc., or similar polishing pads.

The polishing efficiency of the polishing composition does not diminish and even increases during the initial 10 to 30 minutes of polishing. In addition, the polishing characteristics of the composition are not lost on one cycle of polishing. A high level of polishing efficiency is retained even after many cycles of polishing, and the polishing composition can be reused in many polishing operations. Therefore, this invention provides an economical, cost-effective means of repeatedly polishing metal surfaces with reusable polishing compositions.

The present invention will now be described in more detail with reference to the following specific, non-limiting examples.

GENERAL PARAMETERS FOR THE EXAMPLES

The metal substrate polished in the following Examples 1, 2 and 3 was a 130 mm diameter nickel-plated aluminum memory disc. The indicated polishing compositions were applied to the memory disc and polished with a Hahn & Kolb 2L-801-S polishing machine, outfitted with a Rodel Suba 750 polishing pad. After completing the following polishing tests, the surface of the metal was inspected for the presence or absence of stains, scratches, and the like. The metal surface was then compared to the control test, as set forth in Table 1 and Table 2 to evaluate the effectiveness of the particular polishing composition. Surface roughness was measured with a Tencor Alpha Step 200 tester.

EXAMPLE 1

A series of aqueous polishing compositions were prepared as indicated in Table 1 comprising about 1% to about 6% by weight of aluminum, calcium or magnesium salts and about 10% by weight of aluminum oxide with a near particle size of about 1 micron. The first composition in Table 1 is a control which did not contain any salts.

TABLE 1

| All Samples Have Abrasive Agent 1 Micron Alumina, 10% Solids | | | |
|---|---|---|---|
| Composition Sample No. | Wt. % Of Salt | Avg. Removal (Microns) | Avg. Surface Roughness (Angstroms) |
| 1. | None | 15 | 153 |
| 2. | 1% $AlCl_3$ | 17 | 110 |
| 3. | 5% $Al(NO_3)_3$ | 23 | 40 |
| 4. | 1% $AlCl_3$, 5% $Al(NO_3)_3$ | 27 | 20 |
| 5. | 0.5% $CaCl_2$, 2% $Ca(NO_3)_3$ | 25 | 25 |
| 6. | 2% $Mg(ClO_4)_2$ | 24 | 20 |

Table 1 shows that the addition of salt or a combination of salts, and in particular, aluminum nitrate, considerably improves the polishing effectiveness of aluminum oxide abrasive. The results of the experiments using polishing compositions 3 and 4 in Table 1 supports the belief that the aluminum nitrate reacts with the metal surface and generates the metal nitrate and colloidal alumina. The same general type of reaction is believed to occur with other salts.

Table 1 further shows that the combination of salts was more effective than any salt by itself in achieving a high removal finish and a low average roughness.

EXAMPLE 2

A series of aqueous polishing compositions were prepared as indicated in Table 2 comprising about 0.5% to about 15% by weight of aluminum salts and about 10% by weight of aluminum oxide with a mean particle size of about 1 micron. The first composition in Table 2 is a control which did not contain any salts.

TABLE 2

All Samples Have Abrasive Agent 1 Micron Alumina, 10% Solids

| Composition Sample No. | Wt % of Salts | | | Pitting | Avg. Removal (Microns) | Avg. Surface Roughness (Angstroms) |
| --- | --- | --- | --- | --- | --- | --- |
| | $AlCl_3$ | $Al(NO_3)_3$ | $Al(ClO_4)_3$ | | | |
| 1. | 0.0 | 0 | 0 | No | 7 | 160 |
| 2. | 0.5 | 0 | 0 | No | 10 | 125 |
| 3. | 1.0 | 0 | 0 | No | 17 | 110 |
| 4. | 2.5 | 0 | 0 | No | 19 | 90 |
| 5. | 5.0 | 0 | 0 | Yes | 21 | 90 |
| 6. | 0.0 | 1% | 0 | No | 15 | 90 |
| 7. | 0.0 | 2% | 0 | No | 22 | 70 |
| 8. | 0.0 | 5% | 0 | No | 22 | 70 |
| 9. | 0.0 | 10% | 0 | No | 23 | 65 |
| 10. | 0.0 | 15% | 0 | Yes | 23 | 80 |
| 11. | 0.5 | 2.5 | 0 | No | 21 | 40 |
| 12. | 1.0 | 5% | 0 | No | 27 | 20 |
| 13. | 5.0 | 15% | 0 | Yes | 30 | 100 |
| 14. | 1.0% | 5% | 0.2% | No | 28 | 20 |
| 15. | 1.0% | 5% | 0.4% | No | 30 | 20 |
| 16. | 1.0% | 5% | 1% | Yes | 35 | 40 |

Table 2 shows that the unit removal by aluminum oxide increases as the salt weight percent is increased. At some point, as the salt weight percent is increased, the polishing rate will increase no further and roughening and pitting of the metal substrate begin to increase. Of the salts used, aluminum nitrate and aluminum chloride gave particularly high polishing removal units. Furthermore, the addition of aluminum perchlorate improves the removal rate while maintaining a good surface finish.

EXAMPLE 3

A series of aqueous polishing compositions were prepared comprising calcium, iron, magnesium and zinc salts as indicated in Table 3. The salts were present either singly or in combination in about 0.25% to about 5% by weight of the polishing composition. The amounts of these salts added are much less than would be used with the aluminum salts since their oxides, generated by the reaction of the salt with the metal surface, are more easily removed.

TABLE 3

All Samples Have Abrasive Agent 1 Micron Alumina, 10% solids

| Composition Sample No. | Wt % of Salts | Pitting | Avg. Removal (Microns) | Avg. Surface Roughness (Angstroms) |
| --- | --- | --- | --- | --- |
| 1. | 0.5% $CaCl_2$, 2% $Ca(NO_3)_2$ | No | 25 | 25 |
| 2. | 1.0% $CaCl_2$, 4% $Ca(NO_3)_2$ | Yes | 27 | 35 |
| 3. | 0.25% $ZnCl_2$, 1% $Zn(NO_3)_2$ | No | 28 | 27 |
| 4. | 0.5% $ZnCl_2$, 2% $Zn(NO_3)_2$ | Yes | 29 | 40 |
| 5. | 0.5% $MgCl_2$, 2% $Mg(NO_3)_2$ | No | 27 | 30 |
| 6. | 1.0% $MgCl_2$, 4% $Mg(NO_3)_2$ | Yes | 30 | 40 |
| 7. | 2.0% $Mg(ClO_4)_2$ | No | 24 | 20 |
| 8. | 4.0% $Mg(ClO_4)_2$ | Yes | 26 | 45 |
| 9. | 0.25% $FeCl_3$ | No | 24 | 25 |
| 10. | 0.5% $FeCl_3$ | Yes | 27 | 30 |

Table 3 also indicates that a two-fold increase in a given salt or combination of salts, in an attempt to improve the effectiveness of the polishing composition, results instead in pitting and increased roughening of the metal substrate.

EXAMPLE 4

Table 4 shows the polishing effectiveness of a polishing composition comprising a combination of zinc salts and about 10% by weight of aluminum oxide with a mean particle size of about 1 micron on a 4-inch steel disc substrate. Two polishing tests using the same polishing composition were conducted.

TABLE 4

| | Avg. Removal (Microns) | Avg. Surface Roughness (Angstroms) |
| --- | --- | --- |
| 1 micron alumina, 10% Solids 2% $ZnCl_2$, 1% $Zn(NO_3)_2$ | | |
| Test #1 | 19 | 40 |
| Test #2 | 21 | 35 |

EXAMPLE 5

Table 5 shows the polishing effectiveness of a polishing composition comprising a combination of magnesium salts and about 10% by weight of aluminum oxide with a mean particle size of about 1 micron on a 3-inch aluminum disc. As in Example 4, two polishing tests were conducted using the same polishing composition.

TABLE 5

|  | Avg. Removal (Microns) | Avg. Surface Roughness (Angstroms) |
|---|---|---|
| 1 micron alumina, 10% solids 2% Mg(NO$_3$)$_2$, 1% MgCl$_2$, 1% Mg (ClO$_4$)$_2$ | | |
| Test #1 | 40 | 40 |
| Test #2 | 41 | 37 |

The present invention may be embodied in other specific forms without departing from the spirit or essential attributes thereof and, accordingly, reference should be made to the appended claims, rather than to the foregoing specification as indicating the scope of the invention.

What is claimed is:

1. A method for polishing a metal surface comprising
   (a) providing an aqueous polishing composition comprising water, an abrasive agent and a salt, wherein the salt is the reaction product of a reaction selected from the group consisting of a reaction between an acid and a base and a reaction between an acid and a metal, wherein the salt includes a cationic component and an anionic component, the cationic component being selected from the group consisting of ionized elements which will not deposit by electroless plating on the metal surface being polished;
   (b) applying the composition to a metal surface to be polished; and
   (c) polishing the metal surface.

2. A method according to claim 1, wherein the abrasive agent is selected from the group consisting of cerium oxide, aluminum oxide, zirconium oxide, tin oxide, silicon dioxide, silicon carbide, titanium dioxide and titanium carbide.

3. A method according to claim 2, wherein the abrasive agent comprises particles of about 20 microns or less in size.

4. A method according to claim 1, wherein the combined weight percent of the abrasive agent and the salt is from about 2% by weight to about 50% by weight of the polishing composition.

5. A method according to claim 1 wherein the cationic component of the salt comprises an ionized element selected from the group consisting of Groups IIA, IIIA, IVA and IVB of the periodic table of elements, zinc, cerium, tin and iron ions.

6. A method according to claim 1 wherein the anionic component of the salt is selected from the group consisting of chloride, bromide, iodide, nitrate, phosphate, sulfate and perchlorate ions.

7. A method according to claim 1 wherein the polishing composition comprises at least two salts.

8. A method according to claim 1, wherein the salt concentration is from about 0.1% by weight to about 50% by weight of the polishing composition.

9. A method for polishing a metal surface comprising
   (a) providing an aqueous polishing composition comprising water, an abrasive agent and a salt wherein the salt is formed in situ by adding an acid and a base to an aqueous slurry of the abrasive compound;
   (b) applying the composition to a metal surface to be polished; and
   (c) polishing the metal surface.

10. A method for polishing a metal surface comprising
    (a) providing an aqueous polishing composition comprising water, an abrasive agent and a salt wherein the salt is formed in situ by adding a metal and an acid to an aqueous slurry of the abrasive compound;
    (b) applying the composition to a metal surface to be polished; and
    (c) polishing the metal surface.

11. A method for polishing a metal surface comprising
    (a) providing an aqueous polishing composition comprising water, an abrasive agent and a salt, wherein the salt is selected from the group consisting of aluminum bromide, aluminum chloride, aluminum iodide, zirconyl nitrate, zirconyl sulfate, cerium nitrate, aluminum nitrate, zirconyl chloride, tin chloride, aluminum perchlorate, magnesium chloride, zinc chloride and magnesium perchlorate;
    (b) applying the composition to a metal surface to be polished; and
    (c) polishing the metal surface.

12. A method for polishing a metal surface comprising
    (a) providing an aqueous polishing composition comprising water, an abrasive agent, a salt and an acid in an amount to adjust the pH of the polishing composition to about 1 to about 6, wherein the acid is selected from the group consisting of hydrochloric acid, nitric acid, phosphoric acid and sulfuric acid;
    (b) applying the composition to a metal surface to be polished; and
    (c) polishing the metal surface.

13. An aqueous polishing composition for polishing a metal surface comprising water, an abrasive agent selected from the group consisting of aluminum oxide, cerium oxide, zirconium oxide, tin oxide, silicon dioxide, silicon carbide, titanium dioxide and titanium carbide, and a salt selected from the group consisting of magnesium chloride, aluminum nitrate and magnesium perchlorate.

14. A polishing composition according to claim 13 comprising at least two salts.

15. A polishing composition according to claim 13 wherein the salt concentration is from about 0.1% by weight to about 50% by weight of the polishing composition.

16. A polishing composition according to claim 13 wherein the combined weight percent of the abrasive agent and the salt is from about 2% by weight to about 50% by weight of the polishing composition.

17. A polishing composition according to claim 13 wherein the polishing composition further comprises an acid in an amount to adjust the pH of the polishing composition to about 1 to about 6.

18. A polishing composition according to claim 17 wherein the acid is selected from the group consisting of hydrochloric acid, nitric acid, phosphoric acid and sulfuric acid.

19. A method according to claim 7 wherein the two or more salts provide a synergistic polishing effect on the metal surface being polished compared to a method using a single salt.

20. A polishing composition according to claim 14 wherein the two or more salts provide a synergistic polishing effect on the metal surface being polished compared to a composition containing a single salt.

* * * * *

(12) REEXAMINATION CERTIFICATE (4287th)
United States Patent
Roberts

(10) Number: US 4,959,113 C1
(45) Certificate Issued: Mar. 13, 2001

(54) METHOD AND COMPOSITION FOR POLISHING METAL SURFACES

(75) Inventor: John V. H. Roberts, Newark, DE (US)

(73) Assignee: Rodel, Inc., Newark, DE (US)

Reexamination Request:
No. 90/005,505, Sep. 24, 1999

Reexamination Certificate for:
Patent No.: 4,959,113
Issued: Sep. 25, 1990
Appl. No.: 07/387,474
Filed: Jul. 31, 1989

(51) Int. Cl.[7] .............. B44C 1/22; C03C 15/00; C03C 25/68; C23F 1/00
(52) U.S. Cl. .............. 216/89; 216/52; 216/100; 252/79.2
(58) Field of Search .................. 106/3; 216/38, 216/88, 89; 252/79.1, 79.2, 79.3; 438/692, 693

(56) References Cited

U.S. PATENT DOCUMENTS

| | | |
|---|---|---|
| 1,381,728 | 6/1921 | Menard . |
| 3,930,870 | 1/1976 | Basi . |
| 4,021,263 | 5/1977 | Rosenblum . |
| 4,225,349 | 9/1980 | Koshiyama et al. . |
| 4,226,623 | 10/1980 | Koshiyama et al. . |
| 4,358,295 | 11/1982 | Namba et al. . |
| 4,475,981 | 10/1984 | Rea . |
| 4,601,755 | 7/1986 | Mélard et al. . |
| 4,696,697 | 9/1987 | Kitano et al. . |
| 4,705,566 | 11/1987 | Senda et al. . |
| 4,769,073 | 9/1988 | Tastu et al. . |
| 4,853,000 | 8/1989 | Potter . |
| 4,929,257 | 5/1990 | Miyazaki et al. . |
| 4,956,015 | 9/1990 | Okajima et al. . |

Primary Examiner—William A. Powell

(57) ABSTRACT

The present invention relates to a method of polishing a metal surface using an aqueous polishing composition for metal surfaces comprising water, an abrasive agent, such as sluminum oxide, cerium oxide, zirconium oxide, tin oxide, silicon dioxide, silicon carbide, titanium dioxide and titanium carbide and a salt, or combination of salts, such as aluminum chloride, zirconyl nitrate, zirconyl sulfate, cerium nitrate, aluminum nitrate, aluminum bromide, aluminum iodide, aluminum chloride, zirconyl chloride, tin chloride, aluminum perchlorate, magnesium chloride, zinc chloride, magnesium perchlorate and iron chloride.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 3 and 17 is confirmed.

Claims 7 and 14 are cancelled.

Claims 1, 4–6, 8–13, 15, 16 and 18–20 are determined to be patentable as amended.

New claims 21–77 are added and determined to be patentable.

1. A method for polishing a metal surface comprising:
(a) providing an aqueous polishing composition comprising water, an abrasive agent, and [a salt] *two or more salts*, wherein the [salt is] *salts are* the reaction [product] *products* of a reaction selected from the group consisting of a reaction between an acid and a base and a reaction between an acid and a metal, wherein the [salt includes a cationic component and an anionic component] *salts include cationic components and anionic components*, the cationic [component] *components* being selected from the group consisting of ionized elements which will not deposit by electroless plating on the metal surface being polished;
(b) applying the composition to [a] *the* metal surface to be polished; and
(c) polishing the metal surface.

4. A method according to claim 1, wherein the combined weight percent of the abrasive agent and the [salt is] *salts are* from about 2% by weight to about 50% by weight of the polishing composition.

5. A method according to claim 1, wherein the cationic [component of the salt comprises] *components of the salts comprise* an ionized element selected from the group consisting of Groups IIA, IIIA, IVA and IVB of the periodic table of elements, zinc, cerium, tin and iron ions.

6. A method according to claim 1, wherein the anionic [component] *components* of the [salt is] *salts are* selected from the group consisting of chloride, bromide, iodide, nitrate, phosphate, sulfate and perchlorate ions.

8. A method according to claim 1, wherein the [salt] *salts'* concentration is from about 0.1% by weight to about 50% by weight of the polishing composition.

9. A method for polishing a metal surface comprising:
(a) providing an aqueous polishing composition [comprising] *which is a non-plating composition which comprises* water, an abrasive agent, and [a salt] *two or more salts*, wherein the [salt is] *salts are* formed in situ by adding an acid and a base to an aqueous slurry of the abrasive compound;
(b) applying the composition to [a] *the* metal surface to be polished; and
(c) polishing the metal surface.

10. A method for polishing a metal surface comprising:
(a) providing an aqueous polishing composition [comprising] *which is a non-plating composition which comprises* water, an abrasive agent, and [a salt] *two or more salts*, wherein the [salt is] *salts are* formed in situ by adding a metal and an acid to an aqueous slurry of the abrasive compound;
(b) applying the composition to [a] *the* metal surface to be polished; and
(c) polishing the metal surface.

11. A method for polishing a metal surface comprising:
(a) providing an aqueous polishing composition [comprising] *which is a non-plating composition which comprises* water, an abrasive agent, and [a salt] *two or more salts*, wherein the [salt is] *salts are* selected from the group consisting of aluminum bromide, aluminum chloride, aluminum iodide, zirconyl nitrate, zirconyl sulfate, cerium nitrate, aluminum nitrate, zirconyl chloride, tin chloride, aluminum perchlorate, magnesium chloride, zinc chloride, and magnesium perchlorate;
(b) applying the composition to [a] *the* metal surface to be polished; and
(c) polishing the metal surface.

12. A method for polishing a metal surface comprising:
(a) providing an aqueous polishing composition [comprising] *which is a non-plating composition which comprises* water, an abrasive agent, [a salt] *two or more salts*, and an acid in an amount to adjust the pH of the polishing composition to about 1 to about 6, wherein the acid is selected from the group consisting of hydrochloride acid, nitric acid, phosphoric acid and sulfuric acid;
(b) applying the composition to [a] *the* metal surface to be polished; and
(c) polishing the metal surface.

13. [An] *A non-plating* aqueous polishing composition for polishing a metal surface [comprising] *, which composition comprises* water, an abrasive agent selected from the group consisting of aluminum oxide, cerium oxide, zirconium oxide, tin oxide, silicon dioxide, silicon carbide, titanium dioxide and titanium carbide, and [a salt] *two or more salts* selected from the group consisting of magnesium chloride, aluminum nitrate, and magnesium perchlorate.

15. A polishing composition according to claim 13, wherein the [salt] *salts'* concentration is from about 0.1% by weight to about 50% by weight of the polishing composition.

16. A polishing composition according to claim 13, wherein the combined weight percent of the abrasive agent and the [salt is] *salts are* from about 2% by weight to about 50% by weight of the polishing composition.

18. A polishing composition according to claim 17, wherein the acid is selected from the group consisting of hydrochloric acid, nitric acid, phosphoric acid, and sulfuric acid.

19. A method according to claim [7] *1*, wherein the two or more salts provide a synergistic polishing effect on the metal surface being polished compared to a method using a single salt.

20. A polishing composition according to claim [14] *13*, wherein the two or more salts provide a synergistic polishing effect on the metal surface being polished compared to a composition containing a single salt.

*21. A method according to claim 1, wherein the aqueous polishing composition is a reusable, non-plating aqueous polishing composition.*

22. A method according to claim 21, wherein the metal is selected from the group consisting of aluminum, iron, steel, copper, beryllium, zinc, titanium, and chromium.

23. A method according to claim 22, wherein the metal is aluminum.

24. A method according to claim 22, wherein the metal is copper.

25. A method according to claim 21, wherein the abrasive agent is selected from the group consisting of aluminum oxide, cerium oxide, zirconium oxide, tin oxide, silicon oxide, titanium dioxide, and titanium carbide.

26. A method according to claim 25, wherein the abrasive agent is silicon dioxide, titanium dioxide, or cerium dioxide.

27. A method according to claim 26, wherein the abrasive agent is silicon dioxide.

28. A method according to claim 26, wherein the abrasive agent is titanium dioxide.

29. A method according to claim 26, wherein the abrasive agent is cerium dioxide.

30. A method according to claim 25, wherein the abrasive agent comprises particles of about 20 microns or less in size.

31. A method according to claim 25, wherein the abrasive agent is aluminum oxide having a particle size of about 1 micron or less.

32. A method according to claim 21, wherein the amount of abrasive agent is up to about 10% by weight of the aqueous polishing composition.

33. A method according to claim 21, wherein the salt is present in a trace amount effective for promoting the polishing effectiveness of the abrasive agent.

34. A method according to claim 33, wherein the salt concentration is about 0.1% by weight.

35. A method according to claim 33, wherein the salt concentration is from about 0.25% by weight up to an amount which will not cause pitting of the metal.

36. A method according to claim 35, wherein the salt concentration is up to about 50% by weight.

37. A method according to claim 21, wherein the cationic components of the salts comprise ionized elements selected from the group consisting of Groups IIA, IIIA, IVA, and IVB of the periodic table of elements and zinc, cerium, tin, and iron ions.

38. A method according to claim 37, wherein the cationic components of the salts are selected from the group consisting of aluminum, calcium, cerium, iron, magnesium, tin, zinc, and zirconium.

39. A method according to claim 21, wherein the anionic components of the salts are selected from the group consisting of chloride, bromide iodide, nitrate, phosphate, sulfate, and perchlorate ions.

40. A method according to claim 21, wherein the salt is selected from the group consisting of aluminum bromide, aluminum chloride, aluminum iodide, zirconyl nitrate, zirconyl sulfate, cerium nitrate, aluminum nitrate, zirconyl chloride, tin chloride, aluminum perchlorate, magnesium chloride, zinc chloride, and a magnesium perchlorate.

41. A method according to claim 21, wherein the polishing composition comprises at least two salts.

42. A method according to claim 41, wherein the two or more salts provide a synergistic polishing effect on the metal surface being polished compared to a method using a single salt.

43. A method according to claim 21, wherein the aqueous polishing composition has a viscosity high enough to reduce excessive settling of the abrasive agent but low enough so that the aqueous polishing composition is free flowing.

44. A method according to claim 21, wherein the reusable aqueous polishing composition further comprises an acid in an amount sufficient to adjust the pH of the aqueous polishing composition to about 1 to about 6.

45. A method according to claim 44, wherein the acid is selected from the group consisting of hydrochloric acid, nitric acid, phosphoric acid, and sulfuric acid.

46. A method according to claim 21, wherein the metals are selected from the group consisting of aluminum or copper; wherein the abrasive agent is silicon dioxide, titanium dioxide, or cerium dioxide particles present in an amount up to about 10% by weight of the aqueous polishing composition; wherein the cationic ions of the salts are selected from the group consisting of aluminum, calcium, cerium, iron, magnesium, tin, zinc, and zirconium; wherein the anionic components of the salts are selected from the group consisting of iodide, nitrate, phosphate, and sulfate; and wherein the salts are present in a trace amount effective for promoting the polishing effectiveness of the abrasive agent.

47. A method according to claim 46, wherein the cationic components of the salts are selected from the group consisting of aluminum, calcium, cerium, iron, magnesium, tin, zinc, and zirconium; and wherein the aqueous polishing composition has a viscosity high enough to reduce excessive settling of the abrasive but low enough so that the aqueous polishing composition is free flowing.

48. A method according to claim 21, wherein the polished metal surface has, after polishing with the aqueous polishing composition, an average surface roughness of less than 40 Angtroms.

49. A method for polishing a metal surface comprising:
(a) providing an aqueous polishing composition which is a non-plating composition which consists essentially of water, an abrasive agent, and two or more salts which are the reaction products of an acid and a base or of an acid and a metal, wherein the salts include anionic components and cationic components, with the cationic components being selected from the group consisting of cations which will not deposit by electroless plating on the metal surface being polished;
(b) applying the composition to the metal surface to be polished; and
(c) polishing the metal surface.

50. A method according to claim 49, wherein the salts(s) are formed in situ by adding the acid and the base or the acid and the metal to an aqueous slurry of the abrasive agent.

51. A method according to claim 49, wherein the polished metal surface has, after polishing with the aqueous polishing composition, an average surface roughness of less than 40 Angtroms.

52. A reusable, non-plating aqueous polishing composition for polishing a metal surface, which composition comprises water, an abrasive agent selected from the group consisting of aluminum oxide, cerium oxide, zirconium oxide, tin oxide, silicon dioxide, silicon carbide, titanium dioxide, and titanium carbide, and two or more salts is selected from the group consisting of magnesium chloride, aluminum nitrate and magnesium perchlorate.

53. A non-plating aqueous polishing composition for polishing a metal surface, which composition consists essentially of water, an abrasive agent selected from the group consisting of aluminum oxide, cerium oxide, zirconium oxide, tin oxide, silicon dioxide, silicon carbide, titanium dioxide, and titanium carbide, and two or more salts, selected from the group consisting of magnesium chloride, aluminum nitrate, and magnesium perchlorate.

54. A polishing composition according to claims 52 or 53, wherein the metal is selected from the group consisting of aluminum, iron, steel, copper, beryllium, zinc, titanium, and chromium.

55. A polishing composition according to claim 54, wherein the metal is aluminum.

56. A polishing composition according to claim 54, wherein the metal is copper.

57. A polishing composition according to claim 52 or 53, wherein the abrasive agent is silicon dioxide, titanium dioxide, or cerium dioxide.

58. A polishing composition according to claim 52 or 53, wherein the abrasive agent comprises particles of about 20 microns or less in size.

59. A polishing composition according to claim 52 or 53, wherein the abrasive agent is aluminum oxide having a particle size of about 1 micron or less.

60. A polishing composition according to claims 52 or 53, wherein the amount of abrasive agent is up to about 10% by weight of the aqueous polishing composition.

61. A polishing composition according to claims 52 or 53, wherein the salts are present in a trace amount effective to promote the polishing effectiveness of the abrasive agent.

62. A polishing composition according to claim 61, wherein the salts' concentration is about 0.1% by weight of the polishing composition.

63. A polishing composition according to claim 61, wherein the concentration of the salts is about 0.25% by weight of the aqueous polishing composition up to an amount which will not cause pitting of the metal.

64. A polishing composition according to claim 52 or 53, wherein the two or more salts provide a synergistic polishing effect on the metal surface being polished compared to a method using a single salt.

65. A polishing composition according to claims 52 or 53, wherein the combined weight percent of the abrasive agent and the salts is from about 2% by weight to about 50% by weight of the polishing composition.

66. A polishing composition according to claims 52 or 53, wherein the aqueous polishing composition has a viscosity high enough to reduce excessive settling of the abrasive agent but low enough so that the aqueous polishing composition is free flowing.

67. A polishing composition according to claims 52 or 53, wherein the polishing composition further comprises an acid in an amount sufficient to adjust the pH of the aqueous polishing composition to about 1 to about 6.

68. A polishing composition according to claim 67, wherein the acid is selected from the group consisting of hydrochloric acid, nitric acid, phosphoric acid, and sulfuric acid.

69. A polishing composition according to claims 52 or 53, wherein the metal is selected from the group consisting of aluminum or copper; wherein the abrasive agent is silicon dioxide, titanium dioxide, or cerium dioxide particles present in an amount up to about 10% by weight of the aqueous polishing composition; wherein the salts are present in trace amounts effective for promoting the polishing effectiveness of the abrasive agent; and wherein the aqueous polishing composition has a viscosity high enough to reduce excessing settling of the abrasive but low enough so that the aqueous polishing composition is free flowing.

70. A method according to claim 1, wherein the cationic component is selected from the group consisting of aluminum, calcium, cerium, iron, magnesium, tin, zinc, and zirconium.

71. A method according to claim 1, wherein the cationic components of the salts are iron.

72. A method according to claim 5, wherein the ions are iron ions.

73. A method according to claim 71, further comprising an acid in an amount to adjust the pH of the polishing composition to about 1 to about 6.

74. A method according to claim 21, wherein the cationic components of the salts are iron.

75. A method according to claim 6, wherein the anionic components are selected from the group consisting of chloride, nitrate, and perchlorate.

76. A method according to claim 1, 9, 10, or 11, wherein the aqueous polishing composition further comprises an acid in an amount to adjust the pH of the polishing composition to about 1 to about 6.

77. A method according to claim 1, 11 or 12, wherein the salts in the aqueous polishing composition are two or more added salts.

* * * * *